United States Patent [19]

Beachem

[11] Patent Number: 4,497,572
[45] Date of Patent: Feb. 5, 1985

[54] AUTOMATIC X-RAY MICROFILM READER
[75] Inventor: Ronald G. Beachem, Hopkins, Minn.
[73] Assignee: Med-Tech Micrographics, Inc., Edina, Minn.
[21] Appl. No.: 457,060
[22] Filed: Jan. 10, 1983
[51] Int. Cl.³ .................... G03B 21/48; G03B 21/134
[52] U.S. Cl. .................................. 355/45; 353/26 A
[58] Field of Search ................... 355/44, 45, 41, 5, 9; 353/26 A, 26 R

[56] References Cited

U.S. PATENT DOCUMENTS

| | | | |
|---|---|---|---|
| 3,290,987 | 12/1966 | James et al. | 355/41 X |
| 3,684,366 | 8/1972 | Hollwedel, Jr. | 355/45 X |
| 3,802,771 | 4/1974 | Michelson | 353/26 A |
| 4,339,182 | 7/1982 | Ueda et al. | 355/45 X |

FOREIGN PATENT DOCUMENTS

709072  2/1956  Fed. Rep. of Germany ........ 355/45

Primary Examiner—L. T. Hix
Assistant Examiner—Della J. Rutledge
Attorney, Agent, or Firm—Kinney & Lange

[57] ABSTRACT

An x-ray microfilm reader includes a microcomputer control system for controlling film loading, unloading and searching for a particular frame, as well as controlling exposure times for full-size reproductions ("blow backs") of the x-ray images. The x-ray microfilm is contained in a cartridge which is inserted into a cartridge station of the microfilm reader. When the user depresses an INDEX key, the control system automatically causes the microfilm to be withdrawn from the cartridge and wound onto a takeup reel until the first frame is aligned at a film gate. By entering a numerical value through a keyboard and then actuating a SEARCH switch, the user causes the control system to automatically drive the film until the selected frame is aligned at the film gate. The control system controls operating speeds of the drive motor as a function of the distance between the current frame and the desired frame, so that the microfilm is stopped at the proper frame without undershoot or overshoot. Once the desired frame has been located, the user can insert an x-ray plate or cartridge in a track behind the projection screen. A file monitor switch indicates the presence of the x-ray plate in the track, and the control system disables the film drive and turns off the projection lamp. The user then enters, through numerical keys, a desired exposure time and actuates an EXPOSE switch, which causes the photosensitive film in the x-ray cassette to be exposed to the image from the frame.

15 Claims, 5 Drawing Figures

AUTOMATIC X-RAY MICROFILM READER

BACKGROUND OF THE INVENTION

1. Field of the Invention

The present invention relates to an x-ray microfilm reader in which a magnified x-ray image from a frame of microfilm is projected onto an image plane for viewing by a user or for recording on a photosensitive film.

2. Description of the Prior Art

Microfilm storage of information has found wide use in businesses, libraries, and other establishments where cost and physical space constraints prevent the storage of original documents. Microfilm has also found use in hospitals and clinics for the recording of x-ray images. This is very advantageous, since the original x-rays are large and are inconvenient to store and retrieve if needed later.

One commonly used type of microfilm system for recording x-ray images uses strips of 35 mm microfilm which are stored in plastic jackets. This type of system, however, has several significant disadvantages. First, the individual jackets containing film can become missorted, misplaced, or lost. Second, because viewing is through the plastic jackets, artifacts or "rainbows" can be created which can, in some cases, affect or change the physician's diagnosis.

An improved microfilm format for use in recording x-ray images uses a roll of microfilm which is stored in a cartridge. For example, Minnesota Mining and Manufacturing ("3M") sells a square cartridge which is designed to hold 16 mm microfilms. In this format, none of the images on the long web of microfilm can be lost unless the entire cartridge is lost. Similarly, images cannot be missorted or misfiled unless the entire cartridge is lost. In a typical clinic or hospital operation, all cartridges of x-ray microfilm are kept under a common control in a central location. No one is allowed to take the original cartridge from that location. A microfilm reader is provided to allow personnel to view the images stored on the microfilm.

Any microfilm system, of course, requires a microfilm reader, since the images that are recorded are too small to interpret without being magnified. One type of microfilm reader which has been used in the past includes a hook which attaches onto the microfilm. The drive system for this reader uses the hook to pull the film through the film track.

Another type of microfilm reader uses a drive roller to drive a leader (which is attached to the leading end of the microfilm) through the film track to a takeup reel which is driven by a drive motor. Once the film leader has reached the takeup reel, the takeup reel pulls the leader and attached microfilm through the film track. Rewinding is provided by driving the spindle on which the film is stored in a reverse direction, thus pulling the film out of the film track back onto the spindle.

In the past, the controls for microfilm readers have typically been manual rather than automatic. Controls have typically included a display which indicates a frame number which is incremented or decremented as the microfilm is moved. The user can locate a particular frame by controlling the drive until the correct frame number is displayed. Microfilm readers have typically used three sensors located above the film gate to sense the frame location holes in the microfilm. A center sensor is used to control the frame location, while the sensors on either side of the center sensor indicate the direction in which the film is traveling. These systems have often suffered from undershoot or overshoot of the image, which then requires adjustment so that the frame is centered in the film gate (and thus is centered on the projection screen).

There is a continuing need for simpler, easier-to-use microfilm readers, particularly in the field of x-ray microfilm readers. In particular, there is a continuing need for an improved x-ray microfilm reader which not only provides automatic loading, unloading, and frame searching, but also provides high quality reproduction of the x-ray image, so that the physician can obtain a full-size x-ray transparency for more detailed examination.

SUMMARY OF THE INVENTION

The present invention is an improved x-ray microfilm reader in which a magnified x-ray image from a frame of a web of microfilm located at a film gate is projected onto an image plane. The x-ray microfilm reader of the present invention provides automatic indexing of the first frame of the web to the film gate, automatic searching to align a desired frame at the film gate, and automatic unloading of the film.

The x-ray microfilm reader of the present invention utilizes a cartridge having a rotatable spindle upon which the web of microfilm is wound. A clear plastic leader is attached to the leading end of the microfilm web. Each frame is indicated by a frame location hole, which has a predetermined relationship to the center of that frame.

The x-ray microfilm reader includes a cartridge station, a rotatable takeup reel, and a guide path for guiding the web between the cartridge station and the takeup reel. The film gate is located along the guide path between the cartridge station and the takeup reel. A frame located at the film gate is projected onto the image plane by a projection system which includes lamp means and optic means. The lamp means produces light, and the optic means directs the light along an optical path through the film gate and onto the image plane. A screen is located adjacent the image plane, so that the magnified images can be viewed by the user.

Automatic movement of the web along the guide path is provided by a web drive system which includes motor means, drive roller means, drive roller positioning means, takeup clutch means, cartridge rewind clutch means, hole sensor means, takeup sensor means, a user-actuated INDEX switch, user-actuated frame select means, user-actuated SEARCH switch, and digital computer control means.

The motor means provides rotational drive as a function of a motor control signal from the digital control means. The motor means provides rotational drive which is used to drive the drive roller means, the takeup reel, and the rotatable spindle of the cartridge.

The drive roller positioning means brings the drive roller means into engagement with the web in response to a drive roller control signal from the digital computer control means. The drive roller means engages and drives the web along the guide path toward the takeup reel.

The takeup clutch means provides rotational drive from the motor means to the takeup reel in response to a takeup clutch control signal from the digital computer control means. The rotational drive supplied to the takeup reel is in a direction which tends to pull the web from the cartridge toward the takeup reel.

The cartridge rewind clutch means provides the rotational drive from the motor means to the spindle of the cartridge in response to a rewind clutch control signal from the digital computer control means. When the cassette rewind clutch means is engaged to provide the rotational drive, the spindle is located in a direction which tends to pull the web in a second direction along the guide path to rewind the web onto the spindle.

The hole sensor means is positioned along the guide path and provides a hole sensor signal in response to each frame location hole in the web. The hole sensor means is preferably a sensor which is located above the center of the film gate, so that the frame is centered in the film gate when the frame location hole is aligned with the hole sensor means.

The takeup sensor means provides a takeup sensor signal to the digital computer control means. The takeup sensor signal indicates the presence of the web in the takeup reel.

The user-actuated INDEX switch provides an index signal to the digital computer control means. The index signal indicates that the user desires to have the web advanced automatically from the cartridge to the takeup reel so that the first frame of the web is located at the film gate.

The user-actuated frame select means, which is preferably a numerical keyboard, provides a digital signal to the digital control means which indicates the frame number of the frame on the web which the user wishes to view.

The user-actuated SEARCH switch provides a search signal to the digital computer control means. The search signal indicates that the user wants the web to be moved from the current frame presently located at the film gate to a desired frame (as indicated by the frame number provided by the frame select means).

The user-actuated UNLOAD switch provides an unload signal to the digital computer control means. The unload signal indicates that the user wants the web to be rewound entirely onto the rotatable spindle, so that the cartridge can be removed from the x-ray microfilm reader.

The digital computer control means controls and coordinates the operation of the microfilm reader. The digital computer control means provides a motor control signal to the motor means, the drive roller control signal to the drive roller positioning means, the takeup clutch control signal to the takeup clutch means, and the rewind clutch control signal to the cartridge rewind clutch means. The digital computer control means provides these signals based upon the hole sensor signal provided by the hole sensor means, the takeup sensor signal from the takeup sensor means, and the user inputs: the index signal, the frame number signal, the search signal, and the unload signal.

When the digital computer control means receives the index signal from the user-actuated INDEX switch, it provides a motor control signal to the motor means to cause rotational drive to be provided. It also provides the drive roller control signal and the takeup clutch control signal, so that the drive roller means is brought into engagement with the web and the takeup reel is rotated. The drive roller means engages and drives the web along the guide path toward the takeup reel. When the leader at the leading end of the web enters the takeup reel and begins to be wound on the takeup reel by the rotational drive provided by the takeup clutch means, the takeup sensor means provides the takeup sensor signal. The digital computer control means then discontinues the drive roller control signal, so that the drive roller means is moved out of engagement with the web. All of the drive of the web is then provided through the takeup reel, which pulls the film from the cartridge through the guide path to the takeup reel. The web continues to be advanced by the takeup reel until the hole sensor means provides a hole sensor signal. This indicates the first frame of the web. Upon receiving the hole sensor signal, the digital computer control means stops the motion of the web by discontinuing the takeup clutch control signal and the motor control signal.

When the user wants to view a particular frame, the user enters the desired frame number through the user-actuated frame select means. The digital computer control means receives and stores the desired frame number based upon the frame number signal from the frame select means. When the user actuates the SEARCH switch, the digital computer control means receives the search signal. Based upon a current frame count representing the frame which is currently located in the film gate and the desired frame number, the digital computer control means provides the motor control signal to the motor means and provides either the takeup clutch control signal or the rewind clutch control signal. The particular clutch control signal which is provided depends upon whether the desired frame number is larger or smaller than the current frame count. As the web is moved, the hole sensor means provides the hole sensor signal each time a hole is encountered. The digital computer control means maintains a current frame count and compares that count to the desired frame number. When the two numbers match, the digital computer control means discontinues the motor control signal and the particular clutch control signal.

In particular embodiments of the present invention, the digital computer control signal provides the motor control signal as a function of the difference between the desired frame number and the current frame count. The speed of the rotational drive is controlled so that, as the current frame count approaches the desired frame number, the speed is decreased so that when the hole sensor provides a hole sensor signal corresponding to the desired frame, the movement of the web is stopped. Because the web is decelerated under the control of the digital computer control means as a function of the distance between the current frame count and the desired frame number, problems of undershoot and overshoot are avoided.

When the user actuates the UNLOAD switch, the digital computer control means receives the unload signal. The digital computer means provides the motor control signal to the motor means and the rewind clutch control signal to the cartridge rewind clutch means. The web is then pulled by the spindle of the cartridge along the guide path toward the cartridge until the web is entirely wound on the cartridge spindle.

In preferred embodiments of the present invention, the digital computer control means also controls the making of photographic reproductions of the magnified images. In this preferred embodiment, a guide track for receiving a photosensitive film cassette is provided adjacent the image plane. The cassette is inserted in the track to receive the image before it reaches the screen. A film cassette sensing ("file monitor") switch provides a file monitor signal to the digital control means when the cassette is inserted in the track. The file monitor signal causes the digital computer control means to disable all web movement functions, and also extinguishes the lamp means. The cover of the cassette can then be removed, so that the film is exposed to the image when the lamp means is turned on during an exposure cycle.

An exposure time select means (which is preferably the numerical keyboard) provides input signals to the digital computer control means to select an exposure time. Once the exposure time has been selected and stored by the digital computer control means, the user then initiates an exposure cycle by actuating an EXPOSE switch. Upon receiving an expose signal from the EXPOSE switch, the digital computer control means turns on the lamp means for the exposure cycle (which has a duration determined by the exposure time signals received from the exposure select means).

After an exposure cycle has been completed, the lamp means is again extinguished and remains extinguished until the cover is reinserted in the cassette and the cassette is removed from the guide track. At that time, the film cartridge sense switch changes state. The digital computer control means again turns on the lamp means and enables web movement to occur.

DETAILED DESCRIPTION OF THE PREFERRED EMBODIMENTS

Figures 1, 2, 3, 4:
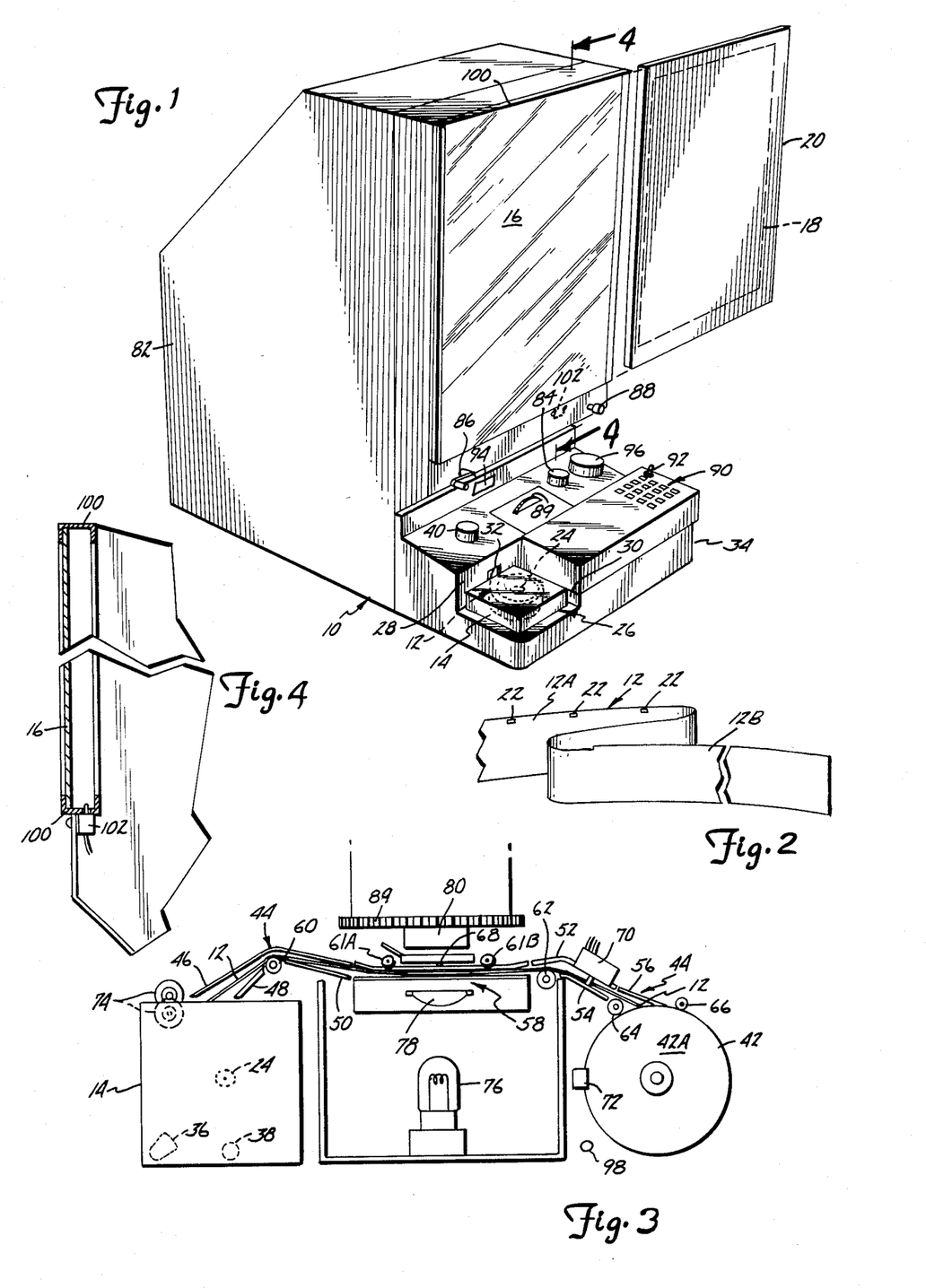
FIG. 1 is a perspective view of a preferred embodiment of the x-ray microfilm reader of the present invention.
FIG. 2 is a perspective representation of an x-ray microfilm web with a clear plastic leader attached at its leading end.
FIG. 3 is top plan view of the web drive system of the x-ray microfilm reader of FIG. 1.
FIG. 4 is a sectional view along section 4—4 of FIG. 1.

FIG. 1 shows a preferred embodiment of x-ray microfilm reader 10 of the present invention. In this embodiment, microfilm reader 10 provides magnified images of x-ray frames recorded on web 12 (which is stored in x-ray microfilm cartridge 14). The magnified images are projected onto a translucent screen 16 to permit viewing by the user. In addition, microfilm reader 10 permits the making of "blow backs" of the x-ray images on photosensitive film 18 of a conventional x-ray plate or cassette 20. FIG. 1 shows cassette 20 before it is inserted into x-ray microfilm reader 10 immediately behind screen 16.

As shown in FIG. 2, web 12 consists of microfilm 12A and clear plastic leader 12B. Leader 12B has a slightly greater width than microfilm 12A. Each frame of microfilm 12A is identified by a frame location hole 22. Holes 22 are located along the upper edge of microfilm 12A, and indicate the location of the center of each frame.

Web 12 is wound on rotatable spindle 24 of cartridge 14. The front and right sides of cartridge 14 are placed against shoulders 28 and 30, respectively, of cartridge station 26. Web 12 is withdrawn from cartridge 14 through opening 32 in shoulder 28 of cartridge station 26.

The travel of web 12 through reader 10 is shown in FIG. 3, which is a top view of the interior of front console 34 of reader 10. As shown in FIG. 3, when cartridge 14 in inserted downward into cartridge station 26, an opening in the lower lefthand corner of the bottom surface of cartridge 14 is engaged by latch lever 36, which holds cartridge 14 securely in place at cartridge station 26. At the same time, cartridge interlock switch 38 is depressed by the bottom surface of cartridge 14. The state of cartridge interlock switch 38 indicates whether cartridge 14 is present at cartridge station 26. Operation of reader 10 is permitted only if power switch 40 (FIG. 1) is turned on and cartridge interlock switch 38 is depressed. The prevents operation of reader 10 when cartridge 14 is either not present in cartridge station 26, or is misaligned so that cartridge interlock switch 38 is not depressed.

Web 12 is transported from cartridge 14 to takeup reel 42 along guide path 44. In the embodiment shown in FIG. 3, guide path 44 is defined by film guides 46, 48, 50, 52, 54 and 56, film gate assembly 58 and idler guide rollers 60, 61A, 61B, 62, 64 and 66.

Hole sensor 68, which is a single light sensor which senses each frame location hole 22, is positioned above the center of the film gate assembly 58. When frame location hole 22 is aligned with hole sensor 68, the corresponding frame of web 12 is aligned with film gate assembly 58.

Leader enable switch 70 is positioned along guide path 44 between film gate assembly 58 and takeup reel 42. Leader enable switch 70 senses the difference in width between leader 12B and microfilm 12A. When web 12 is first being advanced from cartridge 14 to takeup reel 42, leader enable switch 70 changes from a first state to a second state as the end of leader 12B passes. Until this change-of-state of leader enable switch 70 occurs, signals from hole sensor 68 are disregarded. When web 12 is being rewound from takeup reel 42 to cartridge 14, a change of leader enable switch 70 from the second state to the first state and back to the second state indicates that leader 12B has cleared leader enable switch 70. This is used to determine when cartridge latch 36 can be released.

Takeup switch 72 senses the position of the top cover 42A of takeup reel 42. When web 12 is first driven into takeup reel 42, top cover 42A is lifted slightly. As a result, takeup switch 72 changes state.

When cartridge 14 is initially inserted into cartridge station 26 and operation of reader 10 is initiated, drive roller 74 is moved into cartridge 14 from the position shown in solid lines to the position shown in dashed lines in FIG. 3. Drive roller 74 engages web 12 and pushes web 12 through guide path 44. At the same time, takeup reel 42 is being driven in a clockwise direction (when viewed from above as in FIG. 3). When the leader 12B of web 12 reaches takeup reel 42, it begins to be wound on takeup reel 42. As a result, the top plate 42A of takeup reel 42 is lifted slightly, and takeup switch 72 changes state. Drive roller 74 is then withdrawn from cartridge 14, and thereafter takeup reel 42 provides the force which pulls web 12 out of cartridge 14.

Web 12 is rewound into cartridge 14 by spindle 24 of cartridge 14, which is driven in a counterclockwise direction (when viewed from above as in FIG. 3). When the counterclockwise rotational drive is supplied to spindle 24, web 12 is pulled from takeup reel 42 through guide path 44 back into cartridge 14.

The image contained in the microfilm frame which is aligned with film gate 58 is projected onto screen 16 (or x-ray film 18) by a projection system which includes lamp 76, condenser lens 78, projection lens assembly 80 and a rooftop mirror assembly (not shown) which is located within main housing 82 of reader 10. The focusing is provided by slight movement of lens assembly 80, by means of focus adjust wheel 84. Changes in magnification are provided by moving the rooftop mirror assembly within main housing 82 backward or forward by means of hand crank 86. The image can be raised or lowered by rotating the lower mirror of the rooftop mirror assembly upon a top pivot by means of adjustment knob 88. The image projected onto screen 16 can be rotated by prism rotation device 89.

In the embodiment shown in FIG. 1, both automatic and manual control of movement of web 12 through guide path 44 are provided. The automatic controls include a twelve-key keyboard 90, SEARCH/EXPOSE toggle switch 92 and display 94. The manual controls are multiposition rotary select switch 96 and motor speed adjust potentiometer 98. (FIG. 3)

Keyboard 90 and SEARCH/EXPOSE switch 92 allow the user to initiate several different automatic functions: indexing of web 12 so that the first frame of microfilm 12A is aligned with film gate assembly 58; searching for a desired frame; exposure of x-ray film 18 to produce a blow back of the x-ray image; and unloading of web 12 from takeup reel 42 and guide path 44 back into cartridge 14. Keyboard 90 preferably includes ten numerical keys ("0" through "9"), "+" and "−" keys, a "CLEAR" key, an "INDEX" key, a "STORE" key, and a "UNLOAD" key.

When power switch 40 has been turned on and cartridge 14 is inserted into cartridge station 26 so that cartridge interlock switch 38 has been depressed, the user can initiate automatic indexing of the first frame of microfilm 12A at film gate 58 simply by depressing the "INDEX" key of keyboard 90. A current frame count of "1" is displayed by display 94 when the first frame reaches film gate 58. After indexing is complete, the user can automatically locate a desired film frame through the desired frame number through the numerical keys of keyboard 90. The desired frame number is displayed on display 94. When the user then moves switch 92 to the "SEARCH" position, the current frame count is again displayed and film web 12 is moved in the direction which is necessary to move from the current frame to the desired frame. In other words, if the desired frame number is larger than the current frame count, takeup reel 42 is driven in a clockwise direction. Conversely, if the desired frame number is less than the current frame count, spindle 24 of cartridge 14 is driven in a counterclockwise direction. During the automatic search, the current frame count is incremented or decremented as each frame location hole 22 is sensed by hole sensor 68. When the desired frame number is attained, movement of web 12 is halted with the frame location hole 22 aligned with hole sensor 68 and the desired frame aligned with film gate 58.

The "+" and "−" keys of keyboard 90 provide automatic commands to move web 12 by one frame in either direction.

The "CLEAR" key clears the current frame count. This allows an artificial zero frame count to be created at somewhere other than the beginning of web 12.

When the "STORE" key is depressed, the two least-significant digits on display 94 are stored. These two digits represent the exposure time to be used when a blow back is made. For example, if a 1.4 second exposure time is desired, the user depresses the "1" and "4" keys of keyboard 90, and then depresses the "STORE" key. When the user decides that the image displayed on screen 16 should be recorded in the form of a blow back, the user inserts a x-ray film cassette 20 into guide track 100, so that cassette 20 is positioned immediately behind screen 16. When cassette 20 is inserted, file monitor switch 102 (which is located in the bottom of track 100 as shown in FIG. 4) is depressed. This disables the web drive system, so that no movement of web 12 is possible as long as x-ray film cassette 20 is inserted. In addition, lamp 76 is extinguished when switch 102 is actuated. The user can then withdraw the protective cover from the backside of film cassette 20, so that x-ray film 18 is ready to receive the projected image. When SEARCH/EXPOSE switch 92 is moved to the EXPOSE position, lamp 76 is turned on for the exposure time which has previously been stored. When the exposure cycle is completed, lamp 76 is extinguished. The user then reinserts the protective cover onto film cassette 20 and removes cassette 20 from guide track 100. File monitor switch 102 then returns to its original state, and lamp 76 is again turned on. In addition, the web drive system is again enabled, so that movement of web 12 using either the automatic or the manual controls is possible.

In a preferred embodiment of the present invention, lamp 76 operates at about 90% power during film movement and viewing. When a blow back is produced, lamp 76 is operated at 100% power. This allows shorter exposure times during blow backs (and thus high image quality since shorter exposure times minimize the effects of vibration, etc.), while increasing the life of lamp 76.

When the user depresses the "UNLOAD" key of keyboard 90, spindle 24 of cartridge 14 is driven in a counterclockwise direction to rewind web 12 into cartridge 14. When leader enable switch 70 changes state indicating that leader 12B has cleared switch 70, spindle 24 continues to be driven for a predetermined period of time (for example about two seconds). At that point, all of web 12 will have been wound into cartridge 14. The drive to spindle 24 is then terminated, and a cartridge release solenoid 104 (FIG. 5) is actuated to release latch 36. In a preferred embodiment of the present invention, cartridge interlock switch 38 is spring-loaded, and the spring force is sufficient to pop cartridge 14 up slightly so that latch 36 can no longer be in engagement with cartridge 14 unless the user pushes cartridge 14 back down into cartridge station 26.

In the embodiment shown in FIG. 1, manual control of movement of web 12 is also possible by means of select switch 96. Switch 96 is preferably a three-deck, twelve-position rotary select switch. By rotating switch 96 in a clockwise direction from its OFF position, forward movement of web 12 toward takeup reel 42 is provided. The further switch 96 is rotated in the clockwise direction, the faster the motor speed. Reverse motion of web 12 toward cartridge 14 is achieved by rotating switch 96 in the counterclockwise direction from its OFF position. The further switch 96 is rotated in the counterclockwise direction, the faster the reverse speed. Potentiometer 98 provides a speed adjustment of motor speed when operating in the manual mode.

The current frame count is displayed on display 94 in both the automatic and manual modes of operation. As will be described further in conjunction with the electrical schematic diagram of FIG. 5, the control system of reader 10 monitors the manual controls so that automatic operation can be resumed at any time, once select switch 96 has been returned to its OFF position.

Figure 5:
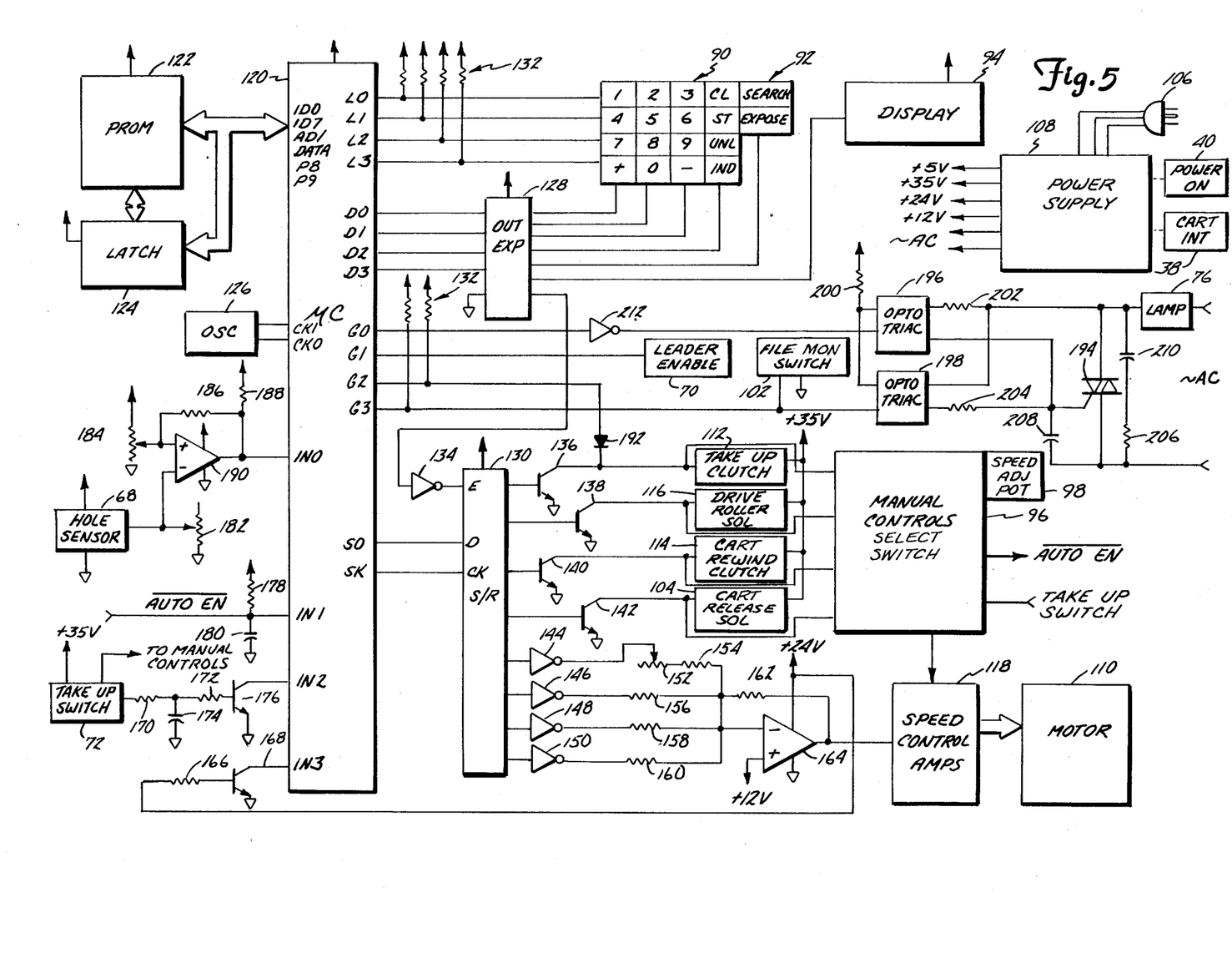
FIG. 5 is an electrical schematic diagram of the control system of the x-ray microfilm reader of the present invention.

FIG. 5 is an electrical schematic diagram of the control system of x-ray microfilm reader 10. Power to reader 10 is provided from a conventional alternating current power line by connector 106. Power supply 108 converts the input AC power to various DC voltage levels necessary to operate the components of the control system. These voltage levels include +5 volts, +12 volts, +24 volts, and +35 volts. In addition, power supply 108 provides the AC voltage used to energize lamp 76. In general, the circuitry of the control system is powered by the +5 volt power supply level, except where otherwise noted in FIG. 5.

Power supply 108 is controlled by power switch 40 and cartridge interlock switch 38. When power switch 40 is turned off, neither the DC nor the AC voltages are provided by power supply 108. When power switch 40 is turned on, but a cartridge 14 is not located at cartridge station 26, cartridge interlock switch 38 prevents power supply 108 from providing the +35 volt, +24 volt and +12 volt levels, although the +5 volt level continues to be provided. This prevents any operation of the web drive system when cartridge interlock switch 38 is not actuated.

All of the rotational drive for movement of film web 12 in guide path 44 is provided by motor 110. The rotational drive from motor 110 is selectively provided to takeup reel 42 by takeup clutch 112. Similarly, cartridge rewind clutch 114 provides rotational drive from motor 110 to spindle 24 of cartridge 14. Drive roller 74 is also driven by motor 110. Drive roller solenoid 116 is actuated during the "indexing" function to bring drive roller 74 into engagement with web 12. The manual controls select switch 96 can also selectively operate takeup clutch 112, cartridge rewind clutch 114, drive roller solenoid 116 and cartridge release solenoid 104. In addition, switch 96 and speed adjust potentiometer 98 determine the speed of the rotational drive provided by motor 110 during manual operation through speed control amplifiers 118.

As described previously, reader 10 of the present invention provides automatic control of both movement of web 12 and exposure of x-ray film 18 during a blow back through keyboard 90 and SEARCH/EXPOSE switch 92. These automatic operations are controlled by a digital computer control system which includes microcomputer 120, programmable read only memory (PROM) 122, latch 124, oscillator 126, output expander 128, shift register 130, and various pull-up resistors 132. Microcomputer 120 includes onboard read/write data storage, read only memory program storage, and timing circuitry. An operating program for the control system is stored in PROM 122. Latch 124 is an intermediate latch used to interface PROM 122 with microcomputer 120. Output expander 128 and shift register 130 are used to increase the effective number of input and output ports available to microcomputer 120. In FIG. 5, output expander 128 receives four data lines from microcomputer 120, and provides seven outputs. The first five outputs of output expander 128 are used to address four columns of keyboard 90 and SEARCH/EXPOSE switch 92. Microcomputer 120 monitors each row of keyboard 90 and SEARCH/EXPOSE switch 92 through its L0-L3 inputs. By energizing a particular column through its D0-D3 outputs and monitoring the L0-L3 inputs, microcomputer 120 interrogates the various keys of keyboard 90 as well as SEARCH/EXPOSE switch 92.

The sixth output from output expander 128 is used to control display 94. In a preferred embodiment of the present invention, display 94 includes a display driver circuit and a digital display. Data is supplied to display 94 serially through output expander 128.

Shift register 130 is enabled by microcomputer 120 through the seventh output of output expander 128 and inverter 134. Shift register 130 receives its input data and clock signals from the SO and SK ports, respectively, of microcomputer 120. Shift register 130 is, in the embodiment shown in FIG. 5, an eight-bit shift register which provides eight outputs.

The first four outputs of shift register 130 control transistors 136, 138, 140 and 142, which turn on or turn off takeup clutch 112, drive roller solenoid 116, cartridge rewind clutch 114 and cartridge release solenoid 104, respectively.

The remaining four outputs of shift register 130 select one of four operating speeds for motor 110. Depending upon the state of the last four outputs of shift register 130, a speed control circuit (which includes inverters 144, 146, 148 and 150, potentiometer 152, resistors 154, 156, 158 and 160 and 162 and operational amplifier 164) provides an analog voltage to speed control amplifiers 118. Four different speeds (super low, low, medium and high) are possible under the control of microcomputer 120.

Through its input IN3, microcomputer 120 determines whether cartridge 14 is in place in cartridge station 26. As discussed previously, cartridge interlock switch 38 is actuated when cartridge 14 is in place. If cartridge interlock switch 38 is not actuated, power supply 108 does not provide the +35 volt, +24 volt, and +12 volt supply voltage levels. Resistor 166 is connected between the +24 volt terminal and the base of transistor 168. The collector of transistor 168 is connected to IN3, and the emitter of transistor 168 is connected to ground. As long as the +24 volt supply is present, IN3 is low. If IN3 goes high, it indicates that a cartridge 14 is not in position in cartridge station 26. In that case, microcomputer 120 ignores all commands from keyboard 90 and SEARCH/EXPOSE switch 92 and does not operate either the web drive or the exposure systems.

Input IN2 monitors the status of takeup switch 72. A monitor circuit including resistors 170 and 172, capacitor 174, and transistor 176 are connected between takeup switch 72 and IN2. When leader 12B enters takeup reel 72, top plate 42A is lifted, thus actuating takeup switch 72. This change-of-state is detected by microcomputer 120 which turns off transistor 138 to deenergize drive roller solenoid 116. This causes drive roller 74 to be withdrawn from cartridge 14.

Input IN1 monitors the status of manual select switch 96. Whenever manual select switch 96 is moved from the OFF position, the signal at IN1 goes high. This indicates to microcomputer 120 that reader 10 is under manual control, and all automatic functions are inhibited. Resistor 178 and capacitor 180 are connected to IN1, to prevent noise from changing the signal at IN1.

Even when manual controls 96 are being utilized, microcomputer 120 continues to monitor the operation of reader 10, and provides the current frame count on display 94. Microcomputer 120, therefore, is ready to take over control of reader 10 at any time that manual select switch 96 is turned off.

Each time a frame location hole 22 in microfilm 12A passes hole sensor 68, microcomputer 120 receives a signal pulse at its IN0 input. In the embodiment shown in FIG. 5, hole sensor 68 is preferably a photodiode which is positioned to receive light from lamp 76 through holes 22. The signal from photodiode 68 is amplified by a Schmitt trigger comparator circuit which includes potentiometers 182 and 184, resistors 186 and 188, and operational amplifier 190.

Microcomputer 120 monitors the leader enable switch 70 through its G1 port. Since leader 12B is transparent, hole sensor 68 receives light during the entire time that leader 12B is passing through the film gate. In order to ensure that the leader 12B is not misinterpreted as a frame location hole, microcomputer 120 does not begin to monitor the signal at its IN0 input until leader enable switch 70 has changed state, thus indicating that leader 12B has passed.

Leader enable switch 70 has another function during the unloading of web 12 from reader 10. During this unloading function, leader enable switch 70 changes state when leader 12B reaches leader enable switch 70 and again when the leading end of leader 12B passes. This indicates that only a short length of web 12 remains in guide path 44. Microcomputer 120 initiates a timing cycle for two seconds, and then turns off transistor 140 and turns on transistor 142. This causes the cartridge rewind clutch 114 to be turned off and causes the release solenoid to be turner on, thus releasing cartridge 14.

As each signal pulse is received at the IN0 input, microcomputer 120 increments or decrements a frame count, depending upon the direction of travel of web 22. During automatic operation, microcomputer 120 controls the operation of takeup clutch 112 and therefore the direction of travel is known. When manual controls 96 are used, the G2 port of microcomputer 120 monitors the status of takeup clutch 112 through diode 192. If IN1 is high, indicating the manual controls 96 are actuated, the status of port G2 indicates whether takeup clutch 112 is turned on. If the signal at G2 is low, this indicates that takeup clutch 112 is turned on and the frame count should be incremented. If the signal at G2 is high, it indicates that takeup clutch 112 is turned off, and thus the frame count should be decremented (since cartridge rewind clutch 114 must be turned on in that case).

During automatic operation, there are three basic functions involving movement of web 12 which are controlled by microcomputer 120 based upon inputs from keyboard 90 and SEARCH/EXPOSE switch 92: index, search, and unload. The index function is performed when cartridge 14 is first inserted into cartridge station 26. Assuming that power switch 40 is ON and manual select switch 96 is OFF, the user initiates the index function by depressing the "INDEX" key on keyboard 90. Microcomputer 120 turns on takeup clutch 112 and drive roller solenoid 116, and also turns on motor 110. When takeup switch 72 changes state (and thus causes a change-of-state at IN2), microcomputer 120 turns off drive roller solenoid 116 while leaving takeup clutch 112 on. When leader enable switch 70 changes state, microcomputer 120 begins monitoring the IN0 input. Once a frame location hole has been sensed, microcomputer 120 turns off takeup clutch 112 and motor 110. At that point, the first frame of microfilm 12A is aligned at the film gate, and display 94 displays a current frame count of "1".

To initiate the automatic search feature, the user enters the desired frame number by depressing the appropriate numerical keys of keyboard 90. Microcomputer 120 causes display 94 to display the desired frame number which has been entered, so that the user can verify that number. When the user moves SEARCH/EXPOSE switch 92 to the "SEARCH" position, microcomputer 120 compares the current frame count with the desired frame number. If the desired frame number is larger than the current count, microcomputer 120 turns on motor 110 and takeup clutch 112. Conversely, if the desired frame number is less than the current count, microcomputer 120 turns on motor 110 and cartridge rewind clutch 114. Microcomputer 120 also causes display 94 to again display the current count, which is incremented or decremented (depending upon the direction of motion of web 12) each time a signal pulse is received at the IN0 input.

During the automatic search function, microcomputer 120 controls the speed of motor 110 to avoid any undershoot or overshoot when the desired frame is reached. Depending upon the outputs of shift register 130, four different possible speeds can be selected by microcomputer 120. In order to avoid inaccuracies in film movement due to inertia, microcomputer 120 controls both acceleration and deceleration of motor 110. In particular, microcomputer 120 compares the desired frame number with the current frame count, and determines the speed of motor 110 based upon that comparison. As web 12 is moved, the difference between the current frame count and the desired frame number becomes less. When this difference reaches a first predetermined value, microcomputer 120 decreases the speed of motor 110 from high speed to medium speed. As web 12 continues to be moved, the difference between the current frame count and the desired frame number continues to decrease until the difference reaches a second predetermined value. Microcomputer 120 then reduces the speed of motor 110 from medium to low speed. Finally, when the difference decreases to a third predetermined value, microcomputer 120 reduces the speed of motor 110 to super low speed. At this point, the web 12 is moving slowly enough so that when hole sensor 68 senses the frame location hole, microcomputer 120 can turn off motor 110 and deactivate either takeup clutch 112 or cartridge rewind clutch 114 quickly enough that web 12 stops with the frame properly aligned within the film gate 58.

Microcomputer 120 controls acceleration in a similar manner. It can be seen that if the difference between the desired frame number and the current frame count is relatively small when the SEARCH/EXPOSE switch 92 is first actuated, motor 110 may never attain the high speed before microcomputer 120 begins to decelerate motor 110.

Incremental movement of web 12 is also possible under automatic control by use of the "+" and "−" keys of keyboard 90. When the "+" key is depressed, microcomputer 120 turns on takeup clutch 112 and turns on motor 110 at the super low speed to move web 12 by one frame toward takeup reel 42. When the "−" key is depressed, microcomputer 120 turns on rewind clutch 114 and turns on motor 110 at super low speed to move web 12 by one frame toward cartridge 14.

The unload function is initiated simply by depressing the "UNLOAD" key of keyboard 90. Microcomputer 120 accelerates motor 110 through signals provided to shift register 30 and turns on cartridge rewind clutch 114. Microcomputer 120 then monitors leader enable switch 70. When leader 12B first reaches leader enable switch 70, the signal at G1 changes state. Once the leading end of leader 12B passes leader enable switch 70, the signal at G1 changes state again. Microcomputer 120 then initiates a timing cycle of two seconds, which is more than sufficient for the remaining portion of web 12 to be wound into cartridge 14. At the end of the timing cycle, microcomputer 120 turns off motor 110, turns off cartridge rewind clutch 114, and activiates cartridge release solenoid 104.

Microcomputer 120 also controls operation of lamp 76 during a blow back exposure cycle. Lamp 76 is energized by AC power from power supply 108. Microcomputer 120 controls operation of lamp 76 through a lamp control circuit which includes triac 194, opto-triacs 196 and 198, resistors 200, 202, 204 and 206, capacitors 208 and 210, inverter 212, and file monitor switch 102.

During normal operation of reader 10, when film cassette 20 is not in track 100, opto-triac 198 is turned on because file monitor switch 102 is normally closed. One input to opto-triac 198 is connected to +5 volts through resistor 200, and the other input is connected to ground through file monitor switch 102. As a result, opto-triac 198 provides a low resistance path between its output terminals and allows triggering of triac 194. The values of resistor 204 and capacitor 208 are selected so that normal operation of lamp 76 is at about 90% of full power. This is sufficient to allow easy reading of the images on screen 16, while enhancing the useful life of lamp 76.

During normal operation, opto-triac 196 is turned off because port G0 is low and the output of inverter 212 is high. Thus both inputs of opto-triac 196 are high, and opto-triac 196 is off.

When film cartridge 20 is inserted into track 110, file monitor switch 102 opens. As a result, opto triac 198 is turned off. This turns off triac 194, and extinguishes lamp 76. Lamp 76 remains off until an exposure cycle is initiated by the user through keyboard 90 and SEARCH/EXPOSE switch 92.

Microcomputer 120 monitors the state of file monitor switch 102 through its G3 port. When file monitor switch 102 opens, G3 goes high, and microcomputer 120 disables web drive functions. No web movement is possible, therefore, as long as film cassette 20 remains in guide track 20. Conversely, no exposure cycle is permitted by microcomputer 120 unless file monitor switch 102 indicates the presence of film cassette 20 in guide track 100.

The user selects an exposure time from 0.1 seconds to 9.9 seconds by depressing the numerical keys of keyboard 90, followed by the "STORE" key. The two least-significant digits which have been entered (and which are displayed on display 94) are stored by microcomputer 120 in an exposure time register. When the user then moves switch 92 to the EXPOSE position, microcomputer 120 turns on opto-triac 196 by changing its G0 port to a high value. Resistor 202 is a much smaller resistance than resistor 204, so that triac 194 is turned on for essentially 100% of each alternating current cycle. Lamp 76, therefore, operates at full power during the exposure cycle. Microcomputer 120 times the exposure cycle, based upon the stored exposure time. When the exposure time has expired, microcomputer 120 turns off opto-triac 196, thus extinguishing lamp 76.

Once the exposure cycle has been completed, the user reinserts the protective cover into film cartridge 20 and then removes film cartridge 20 from track 100. As soon as film cartridge 20 passes file monitor switch 102, opto-triac 198 is again turned on, and microcomputer 120 again enables the web drive functions. Depending upon the desires of the user, another automatic search can then be initiated to locate another image, and thereafter another exposure cycle can be initiated. The x-ray microfilm reader 10 of the present invention provies a rapid and automatic access to any of the frames of microfilm 12A, and provides an extremely simple yet effective control of exposure times. Reader 10 allows the making of blow backs on photographic film 18 using a conventional x-ray film cassette. Film 18 can then be processed using the same equipment that the hospital or clinic uses to process all of its x-ray films. The ability to make an x-ray film blow back permits the physician to again review the patient's previous x-ray and, for example, compare the blow back of the previous x-ray with a current x-ray. With the x-ray microfilm reader 10 of the present invention, therefore, the advantages of microfilm storage of x-rays are achieved without sacrificing the ability of the physician to review x-ray transparencies using the conventional equipment in the hospital or clinic.

Although the present invention has been described with reference to preferred embodiments, workers skilled in the art will recognize that changes may be made in form and detail without departing from the spirit and scope of the invention.

What is claimed is:

1. An microfilm reader for projecting a magnified image from a web of microfilm located at a film gate onto an image plane, wherein the web has a plurality of image frames and a frame location hole indicating a location of each frame, and wherein the web is contained on a rotatable spindle in a cartridge, the microfilm reader comprising:
   a cartridge station for receiving the cartridge;
   a rotatable takeup reel;
   a guide path for guiding the web between the cartridge station and the takeup reel, and wherein the film gate is located along the guide path between the cartridge station and the takeup reel;
   lamp means for providing light;
   means for directing the light from the lamp means along an optical path through the web of the film gate and onto the image plane;
   a screen located proximate the image plane upon which the magnified images can be viewed;
   motor means for providing rotational drive at a speed which is a function of a motor control signal;
   drive roller means positioned adjacent the cartridge station for engaging and driving the web in a first direction along the guide path toward the takeup reel, the drive roller means being driven by the motor means;
   drive roller positioning means for selectively bringing the drive roller means into engagement with the web in response to a drive roller control signal;
   takeup clutch means for providing the rotational drive from the motor means to the takeup reel in response to a takeup clutch control signal to cause movement of the web in the first direction;

cartridge rewind clutch means for providing the rotational drive from the motor means to the spindle of the cartridge in response to a rewind clutch control signal to cause movement of the web in a second direction toward the cartridge;

hole sensor means positioned along the guide path for providing a hole sensor signal in response to each frame location hole in the web;

takeup sensor means for providing a takeup sensor signal indicative of presence of the web in the takeup reel;

user-actuated index means for providing an index signal which indicates that the user desires the web to be advanced automatically from the cartridge to the takeup reel so that a first frame of the web is located at the film gate;

user-actuated means for providing a desired frame number indicative of a frame which the user desires to be located at the film gate;

user-actuated search means for providing a search signal which indicates that the user desires the web to be moved so that the desired frame is located at the film gate;

user-actuated unload means for providing an unload signal which indicates that the user desires the web to be moved in the second direction so that the web is rewound into the cartridge; and digital control means for providing the motor control signal, the drive roller control signal, the takeup clutch control signal and the rewind clutch control signal as a function of the hole sensor signal, the takeup sensor signal, the index signal, the desired frame number, the search signal, and the unload signal; wherein in response to the index signal the digital control means provides the drive roller control signal until the takeup sensor signal is received and provides the motor control signal and the takeup clutch control signal until the hole sensor signal is received indicating the presence of the first frame at the film gate; wherein the digital control means maintains a current frame count based upon hole sensor signals received, the current frame count being incremented when the web is moved in one direction and decremented when the web is moved in an opposite direction; wherein in response to the unload signal the digital control means provides the motor control signal and the rewind clutch control signal; and wherein in response to the search signal the digital control means provides either the takeup clutch control signal or the rewind clutch control signal based upon a sign of a difference between the current frame count and the desired frame number and provides the motor control signal as a function of a magnitude of a difference between the current frame number and the desired frame number, so that the web is decelerated as the current frame count approaches the desired frame number and the web is stopped with the desired frame aligned with the film gate by the digital control means discontinuing the clutch control signal and the motor control signal.

2. The microfilm reader of claim 1 and further comprising:

latch means for holding the cartridge in a fixed position at the cartridge station;

cartridge release means for releasing the latch means in response to a cartridge release signal; and wherein at an end of an unload operation which was initiated by the unload signal, the digital control means terminates the motor control signal and the rewind clutch control signal and provides the cartridge release signal.

3. The microfilm reader of claim 2 and further comprising:

means positioned along the guide path for providing a signal during an unload operation which indicates that a leading end of the web has passed; and wherein the digital control means ends the unload operation a predetermined time period after the signal indicates that the leading end of the web has passed.

4. The microfilm reader of claim 1 wherein the web has a leader attached at its leading end, and wherein the reader further comprises:

leader enable switch means positioned along guide path for providing a leader enable signal when the leader has passed; and wherein during an index operation initiated by the index signal, the digital control means does not respond to the hole sensor signal until after the leader enable signal is received.

5. The microfilm reader of claim 1 and further comprising:

a guide track adjacent the image plane for receiving and holding a photosensitive film cassette so that during an exposure cycle the photosensitive film in the cassette is exposed to the image;

monitor switch means for sensing presence of the cassette in the guide track;

means for initiating an exposure cycle; and lamp control means for controlling the lamp means, wherein the lamp control means extinguishes the lamp means when the monitor switch means senses the presence of the cassette in the guide track; turns on the lamp means for an exposure time period when the exposure cycle is initiated; and turns off the lamp means at the end of the exposure time period until the monitor switch means indicates that the cassette is removed from the guide track.

6. The microfilm reader of claim 5 and further comprising:

user-actuated exposure select means for selecting a duration of the exposure time period.

7. The microfilm reader of claim 6 wherein the user-actuated exposure select means comprises:

a plurality of numerical input keys;

a key for providing store command; and means for storing an exposure time duration value in response to inputs from the numerical key and the store command.

8. The microfilm reader of claim 5 wherein the digital control means disables all web movement functions when the monitor switch means senses presence of the cassette in the guide track.

9. The microfilm reader of claim 5 wherein the lamp control means causes the lamp means to operate at a first intensity when the film cassette is not present in the guide track and causes the lamp means to operate at a second, higher intensity during the exposure time period.

10. An x-ray microfilm reader for projecting a magnified x-ray image from an image frame of a web of microfilm located at a film gate onto an image plane, the x-ray microfilm reader comprising:

a guide path for guiding the web, wherein the film gate is located along the guide path;

lamp means for providing light; means for directing the light from the lamp means along an optical path through the web of the film gate and onto the image plane;

a screen located proximate the image plane upon which the magnified images can be viewed;

web drive means for moving the web in first and second directions along the guide path;

user-actuated means for providing input signals;

web drive control means for controlling the web drive means in response to the input signals;

a guide track adjacent the image plane for receiving and holding a photosensitive film cassette so that during an exposure cycle the photosensitive film in the cassette is exposed to the image;

monitor switch means for sensing presence of the cassette in the guide track;

means for initiating an exposure cycle; and lamp control means for controlling the lamp means, wherein the lamp control means extinguishes the lamp means when the monitor switch means senses the presence of the cassette in the guide track, and wherein the lamp control means turns on the lamp means for an exposure time period when the exposure cycle is initiated and turns off the lamp means at the end of the exposure time period until the monitor switch means indicates that the cassette is removed from the guide track.

11. The x-ray microfilm reader of claim 10 and further comprising:

user-actuated exposure select means for selecting a duration of the exposure time period.

12. The x-ray microfilm reader of claim 11 wherein the user-actuated exposure select means comprises:

a plurality of numerical input keys;

a key for providing store command; and means for storing an exposure time duration value in response to inputs from the numerical key and the store command.

13. The x-ray microfilm reader of claim 10 wherein the web drive control means disables the web drive means when the monitor switch means senses presence of the cassette in the guide track.

14. The x-ray microfilm reader of claim 10 wherein the lamp control means causes the lamp means to operate at a first intensity when the film cassette is not present in the guide track and causes the lamp means to operate at a second, higher intensity during the exposure time period.

15. An microfilm reader for projecting a magnified image from a web of microfilm located at a film gate onto an image plane, wherein the web has a plurality of image frames and a frame location hole indicating a location of each frame, and wherein the web is contained on a rotatable spindle in a cartridge, the microfilm reader comprising:

a cartridge station for receiving the cartridge;

a rotatable takeup reel;

a guide path for guiding the web between the cartridge station and the takeup reel, and wherein the film gate is located along the guide path between the cartridge station and the takeup reel;

lamp means for providing light;

means for directing the light from the lamp means along an optical path through the web of the film gate and onto the image plane;

a screen located proximate the image plane upon which the magnified images can be viewed;

motor means for providing rotational drive at a speed which is a function of a motor control signal;

takeup clutch means for providing the rotational drive from the motor means to the takeup reel in response to a takeup clutch control signal to cause movement of the web in a first direction along the guide path toward the takeup reel;

cartridge rewind clutch means for providing the rotational drive from the motor means to the spindle of the cartridge in response to a rewind clutch control signal to cause movement of the web in a second direction toward the cartridge;

hole sensor means positioned along the guide path for providing a hole sensor signal in response to each frame location hole in the web;

takeup sensor means for providing a takeup sensor signal indicative of presence of the web in the takeup reel;

user-actuated means for providing a desired frame number indicative of a frame which the user desires to be located at the film gate;

user-actuated search means for providing a search signal which indicates that the user desires the web to be moved so that the desired frame is located at the film gate;

digital control means for providing the motor control signal, the takeup clutch control signal and the rewind clutch control signal as a function of the hole sensor signal, the desired frame number, and the search signal; wherein the digital control means maintains a current frame count based upon hole sensor signals received, the current frame count being incremented when the web is moved in the first direction and decremented when the web is moved in the second direction; and wherein in response to the search signal the digital control means provides either the takeup clutch control signal or the rewind clutch control signal based upon a signal of a difference between the current frame count and the desired frame number and provides the motor control signal as a function of a magnitude of the difference between the current frame number and the desired frame number, so that the web is decelerated as the current frame count approaches the desired frame number and the web is stopped with the desired frame aligned with the film gate by the digital control means discontinuing the clutch control signal and the motor control signal.

* * * * *

UNITED STATES PATENT AND TRADEMARK OFFICE
CERTIFICATE OF CORRECTION

PATENT NO. : 4,497,572
DATED : February 5, 1985
INVENTOR(S) : Ronald G. Beachem

It is certified that error appears in the above-identified patent and that said Letters Patent is hereby corrected as shown below:

Claim 15, column 18, line 50, "signal" should be --sign--.

Signed and Sealed this

Twenty-fifth Day of June 1985

[SEAL]

Attest:

DONALD J. QUIGG

Attesting Officer     Acting Commissioner of Patents and Trademarks